United States Patent
Bezzi et al.

(10) Patent No.: US 9,460,311 B2
(45) Date of Patent: Oct. 4, 2016

(54) METHOD AND SYSTEM FOR ON-THE-FLY ANONYMIZATION ON IN-MEMORY DATABASES

(71) Applicants: Michele Bezzi, Le Haut Sartoux-Valbonne (FR); Antonino Sabetta, Mougins (FR)

(72) Inventors: Michele Bezzi, Le Haut Sartoux-Valbonne (FR); Antonino Sabetta, Mougins (FR)

(73) Assignee: SAP SE, Walldorf (DE)

(*) Notice: Subject to any disclaimer, the term of this patent is extended or adjusted under 35 U.S.C. 154(b) by 42 days.

(21) Appl. No.: 13/927,934

(22) Filed: Jun. 26, 2013

(65) Prior Publication Data
US 2015/0007249 A1 Jan. 1, 2015

(51) Int. Cl.
G06F 17/00 (2006.01)
G06F 21/62 (2013.01)

(52) U.S. Cl.
CPC ....... *G06F 21/6254* (2013.01); *G06F 21/6227* (2013.01)

(58) Field of Classification Search
CPC ............. G06F 21/577; G06F 21/6263; H04L 63/0421
See application file for complete search history.

(56) References Cited

U.S. PATENT DOCUMENTS

| 7,055,170 B1* | 5/2006 | Karmouch | H04L 63/0428 726/14 |
|---|---|---|---|
| 7,356,492 B2 | 4/2008 | Hazi et al. | |
| 8,131,999 B2 | 3/2012 | Kerschbaum | |
| 8,141,160 B2 | 3/2012 | Anderson et al. | |
| 8,156,159 B2 | 4/2012 | Ebrahimi et al. | |
| 8,463,752 B2 | 6/2013 | Brinkmoeller et al. | |
| 2005/0187960 A1* | 8/2005 | Nomura | H04L 29/06027 |
| 2008/0005778 A1 | 1/2008 | Chen et al. | |
| 2008/0275900 A1 | 11/2008 | Zurek | |
| 2009/0100527 A1 | 4/2009 | Booth et al. | |
| 2010/0024042 A1* | 1/2010 | Motahari | G06F 21/577 726/26 |
| 2010/0262836 A1 | 10/2010 | Peukert et al. | |
| 2012/0036352 A1 | 2/2012 | Tovar et al. | |
| 2012/0259877 A1 | 10/2012 | Raghunathan et al. | |
| 2013/0346161 A1 | 12/2013 | Mayerle | |
| 2014/0053244 A1 | 2/2014 | Raman et al. | |
| 2014/0123207 A1* | 5/2014 | Agarwal et al. | 726/1 |
| 2014/0123303 A1 | 5/2014 | Shukla et al. | |
| 2014/0172854 A1 | 6/2014 | Huang et al. | |

OTHER PUBLICATIONS

"An information theoretic approach for privacy metrics", Transactions on Data Privacy 3 (2010) 199-215; herein as "Bezzi".*
Bezzi, "An Information Theoretic Approach for Privacy Metrics", Transactions on Data Privacy 3, 2010, pp. 199-215.
Dalenius, "Finding a Needle in a Haystack", Journal of Official Statistics, vol. 2, No. 3, 1986, pp. 329-336.
(Continued)

*Primary Examiner* — Mohammed Waliullah
(74) *Attorney, Agent, or Firm* — Brake Hughes Bellermann LLP

(57) ABSTRACT

The method includes determining, using an in-memory database, a privacy risk associated with a resultant dataset of a query, returning, by the in-memory database, an anonymized dataset if the privacy risk is above a threshold value, the anonymized dataset being based on an anonymization, by the in-memory database, of the resultant dataset, and returning, by the in-memory database, the resultant dataset if the privacy risk is below a threshold value.

20 Claims, 5 Drawing Sheets

(56) References Cited

OTHER PUBLICATIONS

Du, et al, "On Multidimensional k-Anonymity with Local Recoding Generalization", IEEE 23rd International Conference on Data Engineering, Apr. 15-20, 2007, pp. 1422-1424.

Kenig, et al, "A Practical Approximation Algorithm for Optimal k-Anonymity", Data Mining and Knowledge Discovery, vol. 25, Issue 1, Jul. 2012, 33 pages.

Li, et al, "t-Closeness: Privacy Beyond k-Anonymity and l-Diversity", Proceedings of IEEE 23rd Int'l Conf. on Data Engineering, 2007, 10 pages.

Machanavajjhala, et al, "l-Diversity: Privacy Beyond k-Anonymity", ICDE '06, Proceedings of the 22nd International Conference on Data Engineering, Apr. 3-7, 2006, 12 pages.

Meyerson, et al, "On the Complexity of Optimal K-Anonymity", Proceedings of the 23rd ACM SIGMOD-SIGACT-SIGART symposium on Principles of database systems, 2004, 6 pages.

Park, et al, "Approximate Algorithms for k-Anonymity", SIGMOD '07, Jun. 12-14, 2007, 12 pages.

Samarati, "Protecting Respondents' Identities in Microdata Release", IEEE Transactions on Knowledge and Data Engineering, vol. 13, Issue 6, Nov. 2001, 29 pages.Verykios, et al, "State-of-the-art in Privacy Preserving Data Mining", ACM SIGMOD Record, vol. 33, Issue 1, Mar. 2004, pp. 50-57.

Verykios, et al, "State-of-the-art in Privacy Preserving Data Mining", ACM SIGMOD Record, vol. 33, Issue 1, Mar. 2004, pp. 50-57.

Xiao, et al, "The Hardness and Approximation Algorithms for L-Diversity", EDBT, Mar. 22-26, 2010, 13 pages.

\* cited by examiner

METHOD AND SYSTEM FOR ON-THE-FLY ANONYMIZATION ON IN-MEMORY DATABASES

FIELD

Embodiments relate to providing anonymous (e.g., masking or crowding personal information) datasets based on queried data.

BACKGROUND

The anonymization of data sets that include privacy-critical information is of great relevance in many common business data processing scenarios. Generally, anonymizing data sets accomplished utilizing approximated techniques. These techniques are still very demanding in terms of computational resources, because of the characteristics of existing algorithms and due to the typically large size of datasets to process. Consequently, anonymization is typically done off-line (e.g., not in real-time).

The increasing availability of large and diverse datasets (e.g., Big Data representing customer data, transactions, demographics, product ratings, and the like) help businesses acquire insights on their markets and customers, and predict what's next. Fully exploiting big data raises various issues related to the possible disclosure of sensitive or private information. In particular, big data often contains a large amount of personal information, which is subject to multiple and stringent privacy regulations (EU data protection directive, HIPAA, and the like). In fact, data protection and privacy regulations impose strong constraints on the usage and transfer of personal information, which makes handling the data complex, costly, and risky from a compliance point of view. As a consequence, personal data are often classified as confidential information, and only a limited number of business users (e.g., high level managers) have access to the data, and under specific obligations (e.g., within the perimeter of the company network, no transfer to mobile devices, and the like). However, many business applications (e.g., business analytics and reporting, recommendation systems) do not need all the personal details on specific individuals, and an anonymized version of the dataset is still an asset of significant value that can address the business requirements in most of the cases.

Anonymization may increase protection, lower the privacy risk, and enable a wider exploitation of data. However, Anonymization techniques are typically computationally intensive. As a result, Anonymization is conventionally limited to off-line scenarios or small size datasets which diminishes their business impacts by not allowing the usage for more advanced applications (e.g., real-time analytics and on-demand data services).

In conventional technologies, querying a large database and extracting an anonymized dataset in real-time is not possible, and most anonymization processes are run offline (i.e., as a batch processes). Typically users are prevented from retrieving data from databases as soon as these databases provide, even if only in some specific table, some sort of personal information. Therefore, a need exists for processing large volumes of data, in real time, as well as anonymizing the data as necessary in real time.

SUMMARY

One embodiment includes a method. The method includes determining, using an in-memory database, a privacy risk associated with a resultant dataset of a query, returning, by the in-memory database, an anonymized dataset if the privacy risk is above a threshold value, the anonymized dataset being based on an anonymization, by the in-memory database, of the resultant dataset, and returning, by the in-memory database, the resultant dataset if the privacy risk is below a threshold value.

Another embodiment includes a system. The system includes a non-transitory computer readable medium including code segments that when executed by a processor cause the processor to determine, using an in-memory database, a privacy risk associated with a resultant dataset of a query, return, by the in-memory database, an anonymized dataset if the privacy risk is above a threshold value, the anonymized dataset being based on an anonymization, by the in-memory database, of the resultant dataset, and return, by the in-memory database, the resultant dataset if the privacy risk is below a threshold value.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
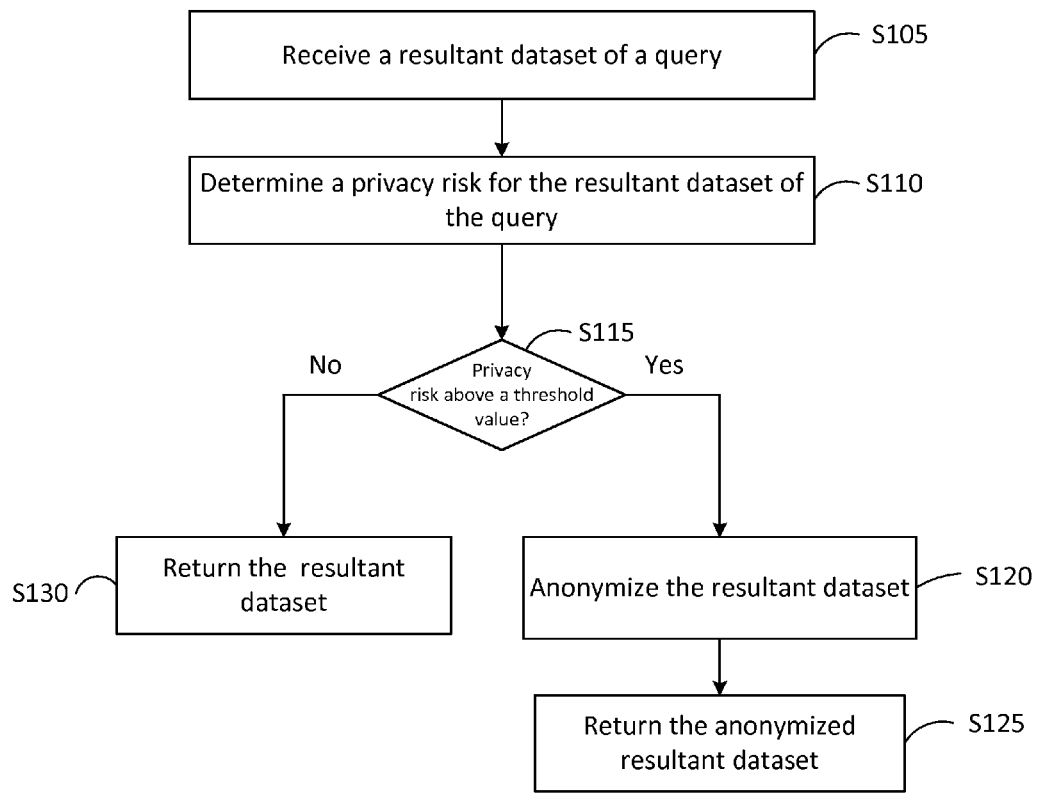
FIG. 1 illustrates a method for generating an anonymous data dataset according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

From a data privacy standpoint, the data stored in database tables and the columns (data attributes) of the tables may be classified as identifiers, quasi-identifiers and sensitive attributes. Identifiers may be data attributes that can uniquely identify individuals. For example, identifiers may include a Social Security Number, a passport number, and a complete name. Quasi-identifiers (QIs) or key attributes, when combined, may be used to identify an individual. For example, quasi-identifiers may include a postal code, age, gender, and the like.

Sensitive attributes may include intrinsically sensitive information about an individual or institution. For example, the information may include diseases, political or religious views, income, and the like. The information may include salary figures, restricted financial data, and the like. Anonymization methods may be applied to obfuscate the identifiable information by generalizing the data. For example, obfuscate the identifiable information may include replacing identifiers with random values, replacing a real name with a randomly chosen one, recoding variables into broader classes (e.g., releasing only the first two digits of a zip code, rounding numerical data, suppressing part of, or, entire records), randomly swapping some attributes in the original data records, applying permutations or perturbative masking (e.g., adding random noise to numerical data values).

Example embodiments provide methods and a system to enable on-the-fly anonymization of data retrieved by querying a database containing private information. The advent of advanced In-Memory databases allows for efficient processing of high volumes of data (e.g., Big Data). For example, applications running on an In-Memory database (e.g., high-performance analytic appliance (HANA)) are capable of processing large volumes of data in real time. The HANA (e.g., SAP™ HANA) may be a data warehouse appliance for processing high volumes of operational and transactional data in real-time. HANA may use in-memory analytics, an approach that queries data stored in random access memory (RAM) instead of on hard disk or flash storage. Therefore, the system may include an architecture implementing the methods on an in-memory database platform (e.g., SAP™ HANA) at run-time.

Figure 4:
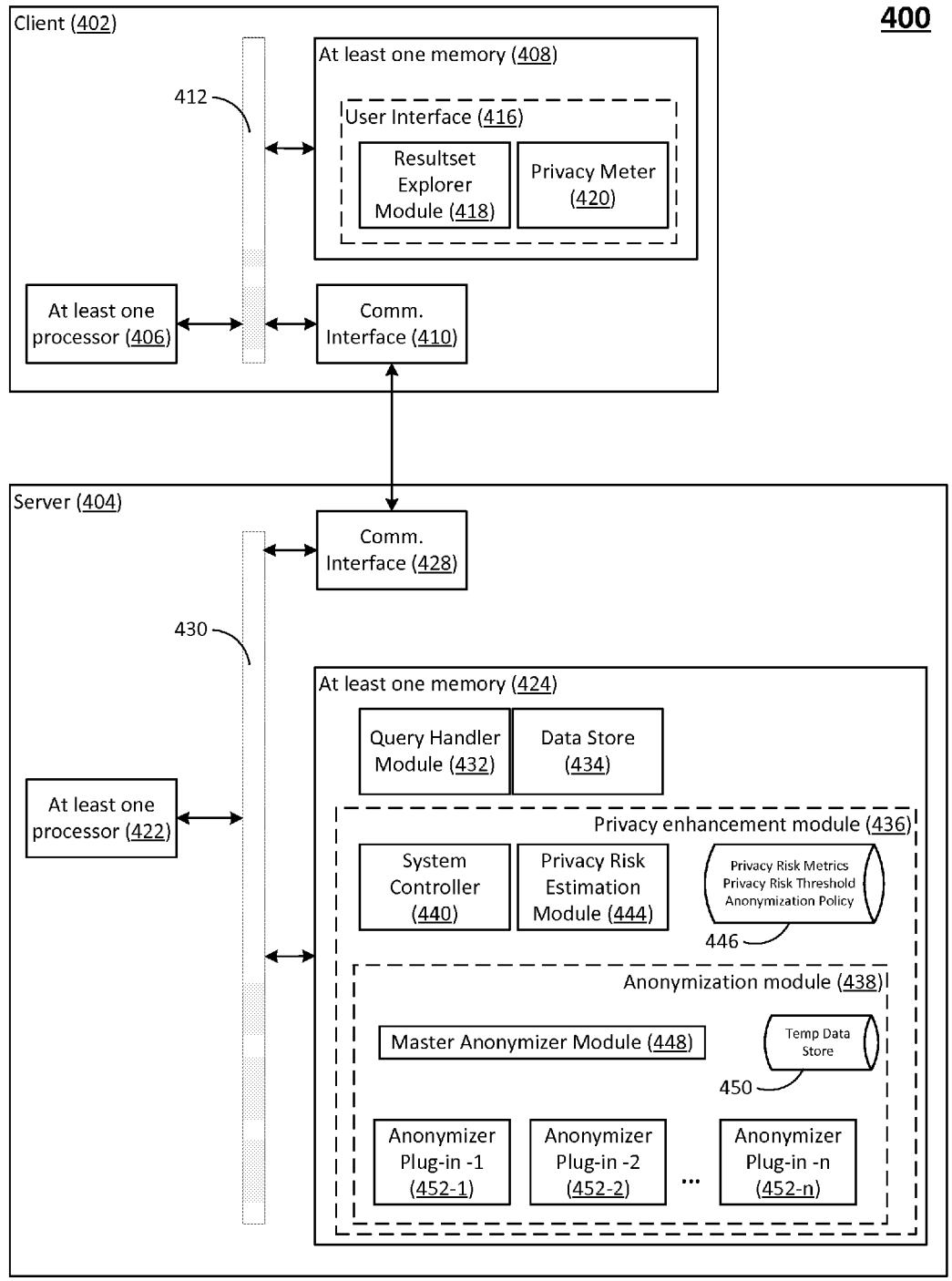
FIG. 4 illustrates a block diagram of a system according to at least one example embodiment.

FIG. 1 illustrates a method for generating an anonymous data dataset according to at least one example embodiment. The method steps described with regard to FIG. 1 may be executed as software code stored in a memory (e.g., at least one memory 408 or 424 described below) associated with a system (e.g., as shown in FIG. 4) and executed by at least one processor (e.g., at least one processor 406 or 422 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the privacy enhancement module 436 described below) and/or the apparatus 400. Although the steps described below are described as being executed by a processor, the steps are not necessarily executed by a same processor. In other words, at least one processor may execute the steps described below with regard to FIG. 1.

As shown in FIG. 1, in step S105 a processor (e.g., at least one processing unit 422) receives a resultant dataset of a query. For example, a server including a database may receive a query command from a client. The query may be in a structured query language (SQL). The database may generate the query as the resultant dataset of the query. A module associated with the server, the database, and/or the client may receive the resultant dataset of the query In step S110 the processor determines a privacy risk for the resultant dataset of the query. For example, the privacy risk may be determined based on at least one privacy metric. The privacy metric may be associated with a policy for anonymizing data (e.g., an anonymization policy) as determined by, for example, a system administrator or system designer. The metrics may be associated with an anonymity metric (e.g., k-anonymity) and/or a diversity metric (e.g., l-diversity). The privacy risk may be assigned a value (e.g., 1 to 100) such that a low value (e.g., 7) indicates a low privacy risk and a high value (e.g., 88) indicates a high privacy risk. Example embodiments are not limited to the aforementioned number range or the privacy risk the number value represents. For example, the value may be 1-10 with the high value (e.g., 9) indicating a low privacy risk and the low value (e.g., 2) indicating a high privacy risk.

In step S115 the processor determines if a privacy risk of the resultant dataset of the query is above a threshold value. For example, continuing the example above, if a low value indicates a low privacy risk, a high value indicates a high privacy risk, and a threshold value is set at 65, any determined privacy risk value greater than (or equal to) 65 may be determined as a resultant dataset having a high privacy risk (e.g., above the threshold value). If the privacy risk of the resultant dataset of the query is above the threshold value, processing continues to step S120. Otherwise processing continues to step S130.

In step S120 the processor anonymizes the resultant dataset. For example, one of the columns of the resultant dataset may include an identifier (e.g., a social security number). The processor may anonymize data in this (identifier) column. For example, the column may be removed from the dataset, the data may be truncated (e.g., show the last four digits of the social security number), the data may be assigned to a range, the data may be randomized and the like.

In step S125 the processor returns the anonymized dataset. For example, the data may return a dataset with the data associated with the (identifier) column anonymized. For example, the data may return a dataset with the data associated with the (identifier) column including the last four digits of a social security number. Otherwise, in step S130 the processor returns the resultant dataset (e.g., a dataset that has not been anonymized).

Figure 2:
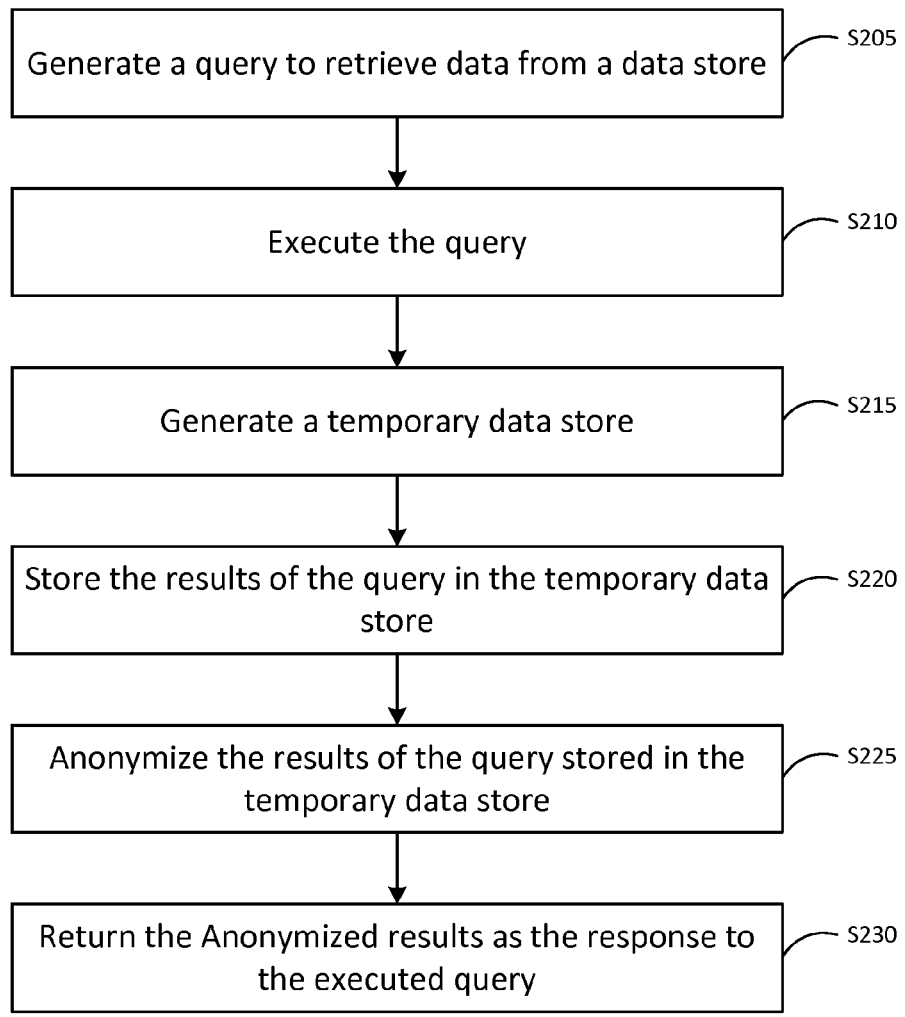
FIG. 2 illustrates another method for generating an anonymous data dataset according to at least one example embodiment.

FIG. 2 illustrates another method for generating an anonymous data dataset according to at least one example embodiment. The method steps described with regard to FIG. 2 may be executed as software code stored in a memory (e.g., at least one memory 408 or 424 described below) associated with a system (e.g., as shown in FIG. 4) and executed by at least one processor (e.g., at least one processor 406 or 422 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the privacy enhancement module 436 described below) and/or the apparatus 400. Although the steps described below are described as being executed by a processor, the steps are not necessarily executed by a same processor. In other words, at least one processor may execute the steps described below with regard to FIG. 2.

As shown in FIG. 2, in step S205 a processor (e.g., at least one processing unit 422) generates a query to retrieve data from a data store. For example, a server including a database (with a data store) may receive a request for filtered data (e.g., a query) from a client (e.g., via a user interface). A module associated with the database may generate a SQL statement based on the request for filtered data. The request for filtered data may also be in the form of a SQL statement. The processor may generate the query (or parse a SQL statement) to retrieve data from the data store based on the request for filtered data.

In step S210 the processor executes the query. For example, the processor may execute the SQL statement (e.g., SELECT Query and/or CREATE View) on the data store.

In step S215 the processor generates a temporary data store. For example, the processor may execute the SQL statement (e.g., CREATE Database, CREATE Table and/or CREATE View) on the data store. For example, the processor may request a block of memory to store data from the data store. The block of memory may be a temporary assignment. The temporary assignment may include a pointer and/or a handle for the assigned block of memory. The temporary data store may be a same data store on which the query was executed. The temporary data store may not be a same (e.g., on a different) data store on which the query was executed. The block of memory may be allocated from a same memory (e.g., RAM or hard disk) as the data store on which the query was executed. The block of memory may be allocated from a different memory (e.g., RAM or hard disk) as the data store on which the query was executed.

In step S220 the processor stores the results of the query in the temporary data store. For example, the processor writes the results of the query (e.g., a resultant data set) to the temporary data store The results of the query may be written as a standalone file (e.g., anXML or CSV file). The results of the query may be written to a structured database element (e.g., a table or a view) using a SQL statement (e.g., CREATE or UPDATE).

In step S225 the processor anonymizes the results of the query (e.g., the resultant dataset) stored in the temporary data store. Anonymization of the resultant dataset includes anonymizing (e.g., generalizing) data in at least one column of the resultant dataset. For example, one of the columns of the results of the query may include data associated with an identifier (e.g., a social security number). The processor may anonymize data in this (identifier) column. For example, the column may be removed from the dataset, the data may be truncated (e.g., show the last four digits of the social security number), the data may be assigned to a range, the data may be randomized and the like. For example, a SQL stored procedure may be added to the database (e.g., as a plug-in) for one or more anonymization routines. The stored procedure may include code (e.g., SQL code) configured to cycle through each row in the (identifier) column and anonymize the data recorded in the row. For example, the stored procedure may delete the data, changed the data in a fixed manner (e.g., change a social security number from 123-45-6789 to XXX-XX-6789), or change the data in a random manner (e.g., add or multiply a number by a random number).

In step S230 the processor returns the anonymized results as the response to the executed query. For example, the data may return a dataset with the data associated with the (identifier) column anonymized. For example, the data may return a dataset with the data associated with the (identifier) column including the last four digits of a social security number.

Figure 3:
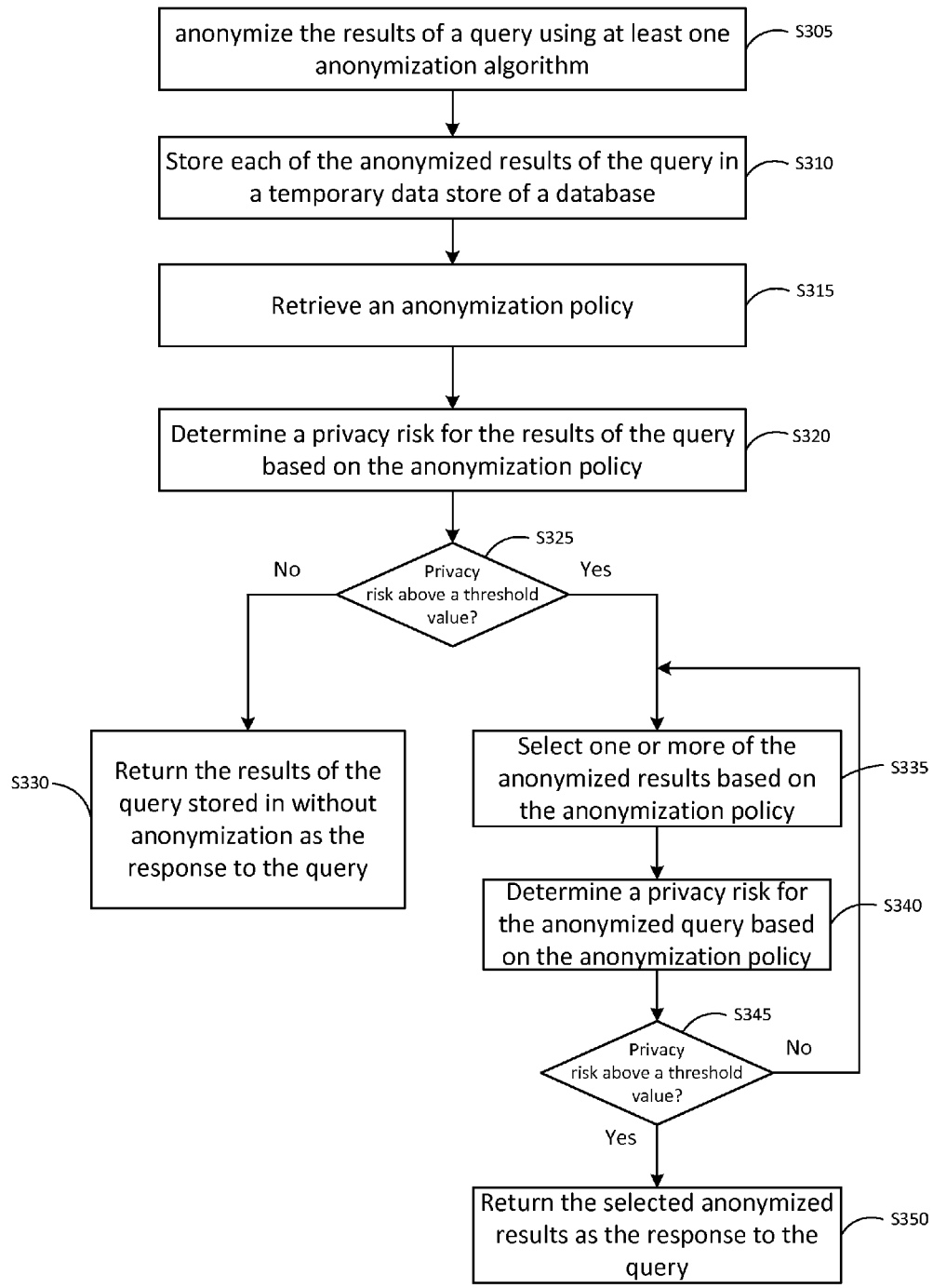
FIG. 3 illustrates still another method for generating an anonymous data dataset according to at least one example embodiment.

FIG. 3 illustrates still another method for generating an anonymous data dataset according to at least one example embodiment. The method steps described with regard to FIG. 3 may be executed as software code stored in a memory (e.g., at least one memory 408 or 424 described below) associated with a system (e.g., as shown in FIG. 4) and executed by at least one processor (e.g., at least one processor 406 or 422 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the privacy enhancement module 436 described below) and/or the apparatus 400. Although the steps described below are described as being executed by a processor, the steps are not necessarily executed by a same processor. In other words, at least one processor may execute the steps described below with regard to FIG. 3.

As shown in FIG. 3, in step S305 a processor (e.g., at least one processing unit 422) anonymizes the results of a query using at least one anonymizing algorithm. For example, one of the columns of the results of the query may include a first identifier (e.g., a social security number). The processor may anonymize data in the first identifier column. For example, the column may be removed from the dataset, the data may be truncated (e.g., show the last four digits of the social security number), the data may be assigned to a range, the data may be randomized and the like. For example, a SQL stored procedure may be added to the database (e.g., as a plug-in) for one or more anonymization routines. The stored procedure may include code (e.g., SQL code) configured to cycle through each row in the first identifier column and anonymize the data recorded in the row. For example, the stored procedure may delete the data, changed the data in a fixed manner (e.g., change a social security number from 123-45-6789 to XXX-XX-6789), or change the data in a random manner (e.g., add or multiply a number by a random number, e.g., adding a random number between −5 to +5 to an "age" field).

Another of the columns of the results of the query may include data associated with a second identifier (e.g., an age). The processor may anonymize data in the second identifier column. For example, the column may be removed from the dataset, the data may be truncated (e.g., show decade age like 20, 30, 40, and the like), the data may be assigned to a range, the data may be randomized and the like. For example, a SQL stored procedure may be added to the database (e.g., as a plug-in) for one or more anonymization routines. The stored procedure may include code (e.g., SQL code) configured to cycle through each row in the second identifier column and anonymize the data recorded in the row. For example, the stored procedure may delete the data, changed the data in a fixed manner (e.g., change an age to a range, for example, change 27 to 20-29), or change the data in a random manner (e.g., add or multiply the age by a random number).

Although the above discussion references anonymizing identifiers, example embodiments are not limited thereto. For example, quasi-identifiers (QI) may me anonymized such that data in a plurality of columns are modified in a coordinated manner. For example, a stored procedure may modify columns including city, state and zip code together in order to anonymize a dataset. In addition, sensitive attributes may be anonymized. For example, a column may include disease data. Each disease in the data may be mapped to a general name. For example, diabetes may be mapped to D1, cancer may be mapped to D2, and so forth.

In step S310 the processor stores each of the anonymized results of the query in a temporary data store of a database. For example, as discussed above, the temporary data store may be a standalone file (e.g., an XML or CSV file) a database or a database element (e.g., a table or a view). Each of the anonymized results may be stored separately (e.g., one table or view for the results of each anonymization routine (or plug-in). Each of the anonymized results may be stored together (e.g., one table or view is shared between each anonymization routine (or plug-in) to store the anonymized results.

In step S315 the processor retrieves an anonymization policy. For example, the anonymization policy may be stored as a standalone file or as a data structure (e.g., table) stored in the database associated with the data store or associated with a separate data store on the same server. The anonymization policy may be configured to store information associated with anonymization. The anonymization policy may include information about what tables and columns of the database contain privacy-critical information. For example, for a patient record table, the policy may specify the list of QI (e.g., city, zip code, etc.) and identifiers (patient name or social security number). The policy may also include additional information related to privacy metrics as applied to applicable algorithms (e.g., privacy risk algorithms and thresholds).

In step S320 the processor determines a privacy risk for the results of the query based on the anonymization policy. For example, the privacy risk may be determined based on at least one privacy metric. The privacy metric may be associated with a policy for anonymizing data (e.g., an anonymization policy) as determined by, for example, a system administrator. The metrics may be associated with an anonymity metric (e.g., k-anonymity) and/or a diversity metric (e.g., l-diversity) and/or a skew metric (e.g., t-closeness). Determining each of the metrics is computationally intensive. Therefore, so as not to limit the metrics applicability to small datasets or to off-line use cases, an In-Memory database (e.g., SAP HANA) may be used to determine the metrics in real-time.

The k-anonymity metric or condition may be based on an analysis of quasi-identifiers (QI) associated with the results of the query (resultant dataset). For example, the k-anonymity metric or condition may require that all (substantially all, most or a subset of) combination of quasi-identifiers is shared by at least k records in the anonymized dataset. A large k value may indicate that the anonymized dataset has a low identity privacy risk, because, at best, an attacker (e.g., a user attempting to discover private information) has a probability 1/k to re-identify a record.

However, k-anonymity may not protect against disclosure of sensitive attributes. For example, a group (with minimal size of k records) sharing the same combination of quasi-identifiers could also have the same sensitive attribute. Therefore, if the attacker is not able to re-identify the record, the attacker may discover the sensitive information. To capture this kind of risk l-diversity was introduced. l-diversity condition requires that for every combination of key attributes there should be at least l values for each confidential attribute.

Although, l-diversity condition may prevent the possible attacker from inferring exactly the sensitive attributes, the attacker may still learn a considerable amount of probabilistic information. In particular if the distribution of confidential attributes within a group sharing the same key attributes is substantially dissimilar from the distribution over the whole set, an attacker may increase the attacker's knowledge of sensitive attributes (e.g., a skewness attack). t-closeness estimates this risk by computing the distance between the distribution of confidential attributes within the group and in the entire dataset.

These measures provide a quantitative assessment of the different risks associated to private data release, and each of them (or a combination of them) can be applied to determine (or estimate) a privacy risk depending on specific use cases. The determined (or estimated) privacy risk may be assigned (e.g., as an output of a function or algorithm) a numerical privacy risk value. The privacy risk value may be a value (e.g., 1 to 100) such that a low value (e.g., 7) indicates a low privacy risk and a high value (e.g., 88) indicates a high privacy risk. Example embodiments are not limited to the aforementioned number range or the privacy risk the number value represents. For example, the value may be 1-10 with the high value (e.g., 9) indicating a low privacy risk and the low value (e.g., 2) indicating a high privacy risk.

In step S325 the processor determines if a privacy risk of the results of the query is above a threshold value. For example, continuing the example above, if a low value indicates a low privacy risk, a high value indicates a high privacy risk, and a threshold value is set at 65 (as read from the anonymization policy), any determined privacy risk value greater than (or greater than or equal to) 65 may be determined as a resultant dataset having a high privacy risk (e.g., above the threshold value). If the privacy risk of the results of the query is above a threshold value, processing continues to step S335. Otherwise processing continues to step S330.

In step S330 the processor returns the result of the query stored without anonymimization as the response to the query. For example, if the results of the query do not violate any privacy policies (e.g., a privacy risk below a threshold), the processer may returns the result of the query without anonymimization as the response to the query. The results may have been stored in a data store as part of an earlier step.

In step S335 the processor selects one or more of the anonymized results based on the anonymization policy. For example, as described above, one of the anonymized results includes a modified first identifier column with modified social security numbers. The processor may select a table or view including the first identifier column as the anonymized results (as well as other data based on the schema of the query). Alternatively, the processor may select column of a table or view including the first identifier column as the anonymized results and replace the equivalent column in the result of the query creating a new anonymized resultant dataset.

In step S340 the processor determines a privacy risk for the anonymized query based on the anonymization policy. For example, as discussed above, a privacy risk value may be calculated based on, for example, an anonymity metric (e.g., k-anonymity) and/or a diversity metric (e.g., l-diversity) and/or a skew metric (e.g., t-closeness). The anonymized resultant dataset may be used as an input to calculate another privacy risk value.

In step S345 the processor determines if a privacy risk of the results of the anonymized query is above a threshold value. For example, continuing the example above, if a low value indicates a low privacy risk, a high value indicates a high privacy risk, and a threshold value is set at 65 (as read from the anonymization policy), any determined privacy risk value greater than (or greater than or equal to) 65 may be determined as a resultant dataset having a high privacy risk (e.g., above the threshold value). If the privacy risk of the anonymized query is above a threshold value, processing continues to step S350. Otherwise processing returns to step S335.

In step S350 the processor returns the selected anonymized results as the response to the query. For example, the data may return a dataset with the data associated with the (first and/or second identifier) column anonymized. For example, the data may return a dataset with the data associated with the (first and/or second identifier) column including the last four digits of a social security number and/or the modified age.

Selecting one or more of the anonymized results based on the anonymization policy, determining and testing the privacy risk may be an iterative process. For example, as described above, the anonymized results may also include a modified second identifier column with a modified age. The processor may select a table or view including the first identifier column and the second identifier column as the anonymized results (as well as other data based on the schema of the query). Alternatively, the processor may select column of a table or view including the second identifier column as the anonymized results and replace the equivalent column in a previously anonymized resultant dataset creating a new anonymized resultant dataset.

FIG. 4 illustrates a block diagram of a system according to at least one example embodiment. As shown in FIG. 4, the system 500 includes a client 402 and a server 404. The client 402 includes at least one processing unit 406, at least one memory 408, and communication interface 410. The at least one processing unit 406, the at least one memory 408, and the communication interface 410 are communicatively coupled via bus 412. The client 402 may be, for example, an element of a personal computer. The server 404 includes at least one processing unit 422, at least one memory 424, and communication interface 428. The at least one processing unit 422, the at least one memory 424, and the communication interface 428 are communicatively coupled via bus 430.

In the example of FIG. 4, the client 402 and the server 404 may be at least one computing device and should be understood to represent virtually any computing device configured to perform the methods described herein. As such, the client 402 and the server 404 may be understood to include various standard components which may be utilized to implement the techniques described herein, or different or future versions thereof. By way of example, the client 402 and the server 404 are illustrated as including the at least one processor 406 and 422 respectively, as well as at least one memory 408 and 424 (e.g., a computer readable storage medium) respectively.

Thus, as may be appreciated, the at least one processor 406 and 422 may be utilized to execute instructions stored on the at least one memory 408 and 424, so as to thereby implement the various features and functions described herein, or additional or alternative features and functions. Of course, the at least one processor 406 and 422 and the at least one memory 408 and 424 may be utilized for various other purposes. In particular, it may be appreciated that the at least one memory 408 and 424 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 408 and 424.

As shown in FIG. 4, the at least one memory 408 includes a user interface 416. The user interface 416 includes a result set explorer module 418 and a privacy meter 420. The user interface 416 may be configured to allow input of parameters to generate a query (e.g. generate a SQL query). The user interface 416 may be configured to display the results of the query, display errors and warnings, and display other information or formats (e.g., a graph based on a dataset) associated with datasets and dataset attributes. The user interface 416 may be configured to, through an enhanced querying and data presentation mechanism, display privacy risk associated with a given result set to a user. Further, when the system performs transparent anonymization, the user interface 416 may display relevant information as to what type of manipulation was performed and what type of information was removed.

The result set explorer module 418 may be configured to allow users (via the user input) to submit queries and to visualize the result set, as produced by the anonymizer. The privacy meter 420 may be configured to feedback information related to the level of privacy risk of the dataset the user is visualizing as well as feedback on the process that was performed to obtain the dataset (e.g., the result of a privacy enhancement or anonymization). The level of risk of the current result set may be shown as a graphical widget (gauge-like) and the numerical value of the metric (e.g., the privacy risk value) used to estimate the risk may also be shown. If the result set was produced as the result of an anonymization step, a description of the anonymization algorithm used and details on the specific parameters used in the algorithm for that particular dataset may be displayed. For example, a generalization that was used to replace names of cities with the name of the region or state where the city is located may be displayed.

As shown in FIG. 4, the at least one memory 424 includes a query handler module 432, a data store 434 and a privacy enhancement module 436. The privacy enhancement module includes a system controller 440, a privacy risk estimation module 444, a database 446, and an anonymization module 438. The anonymization module 438 includes a master anonymizer module 448, a temporary data store 450, and at least one anonymizer plug-in 452-1 to 452-n.

The query handler module 432 may be configured as a dispatcher that connects the user-side components (e.g., user interface 416), the backend data storage (e.g., data store 434) and a privacy enhancer system (e.g., privacy enhancement module 436). The query handler module 432 may be an element of the client 402. However, if the query handler module 432 is an element of the client 402, the query handler module 432 may be further configured to protect privacy-critical data. For example, query handler module 432 may be configured to encrypt returned datasets that may include privacy-critical data. The data store 434 may be configured to store data including data that may have privacy concerns.

The privacy enhancement module 436 may be configured to realize an enhanced database system that offers on-the-fly (e.g., real-time), transparent privacy risk estimation and mitigation as part of a query execution process. The privacy enhancement module 436 may be an element of an in-memory technology in order to provide efficient, on-the-fly anonymization. For example, the privacy enhancement module 436 in conjunction with other elements of server 404 may perform anonymization operations at run-time.

The system controller 440 may be configured to receive the data from the query handler module 432 and coordinates the activation of the privacy risk estimation module 444 and of the anonymization module 438. The privacy risk estimation module 444 may be configured to examine received datasets and, based on the relevant risk metrics and thresholds, determine whether or not the data should be processed to reduce the privacy risk. The evaluation may consider the domain knowledge that is encoded in the anonymization policy. The anonymization policy may include information about what tables and columns of the database contain privacy-critical information. For example, for a PatientRecord table, the anonymization policy could specify the list of QI (e.g., city, zip code, etc.) and identifiers (patient name). The anonymization policy may also contain additional information, used by the anonymization module 438, mapping anonymization objectives expressed related to privacy metrics to applicable algorithms.

The database 446 may be configured to store data associated with privacy enhancement. For example, database 446 may be configured to store the anonymization policy, the privacy risk threshold and privacy risk metrics (and algorithms). The anonymization module 438 may be configured to anonymize a dataset that is generated base on a query of the data store 434. The master anonymizer module 448 may be configured to delegate the anonymization process to the appropriate anonymizer plug-in 452-1 to 452-n. Selecting an anonymizer plug-in 452-1 to 452-n may be based on the characteristics of the dataset, on parameters passed from the system controller 440, and the anonymization policy.

The temporary data store 450 may be configured to store anonymized data. The at least one anonymizer plug-in 452-1 to 452-n may be configured to implement a specific anonymization algorithm. The anonymizer plug-in 452-1 to 452-n receives as input the original result set and a target level of anonymity (e.g., based on the specific algorithm and metric used by the anonymizer plug-in 452-1 to 452-n). The at least one anonymizer plug-in 452-1 to 452-n may be configured to generate, as output, an anonymized version of the result set. Interfaces of the anonymizer plug-in 452-1 to 452-n conform to a common interface specification, which makes it easy to extend the anonymization module 438 with additional modules implementing different algorithms.

Figure 5:
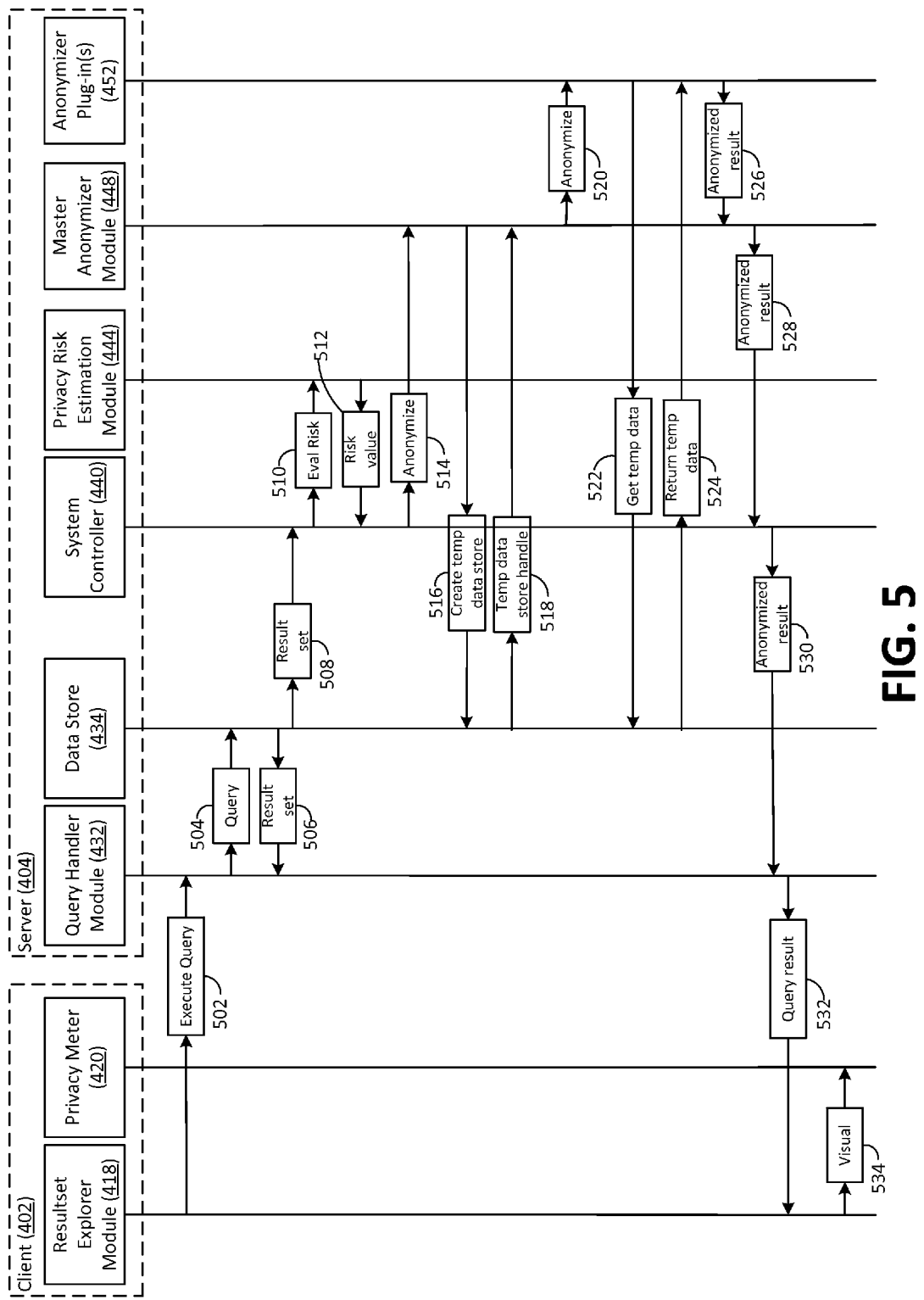
FIG. 5 illustrates a signal flow diagram according to at least one example embodiment.

FIG. 5 illustrates a signal flow diagram according to at least one example embodiment. The blocks described with regard to FIG. 5 may be executed as software code stored in a memory (e.g., at least one memory 408 or 424) associated with a system (e.g., as shown in FIG. 4) and executed by at least one processor (e.g., at least one processor 406 or 422) associated with the system. For example, the processor may be associated with one or more of the blocks (e.g., blocks 418, 420, 432, 434, and the like) or the system 400. However, alternative embodiments are contemplated such as a system embodied as a special purpose processor.

For example, the blocks may be performed by an application-specific integrated circuit, or ASIC. For example, the ASIC may be configured as one or more of the blocks (e.g., blocks 418, 420, 432, 434, and the like) and/or the apparatus 400. Although the blocks described below are described as being executed by a processor, the blocks are not necessarily executed by a same processor. In other words, at least one processor may execute the blocks described below with regard to FIG. 5.

As shown in FIG. 5, client 402 (e.g., client computer or personal computer) and a server 404 may operate together to generate a query and anonymous data associated with the query. The client 402 and the server 404 may be communicatively coupled via, for example, the internet and/or an intranet.

As shown in FIG. 5, the result set explorer module 418 generates a query and transmits a request to execute the query (block 502) to the query handler module 432. For example, the input to the system is a query expressed in, for example SQL, that the user submits using the user interface 416. The query handler module performs a query (e.g., a SQL query) (block 504) on the data store 434. The data store 434 returns a result set (block 506) to the query handler module 432. For example, the query is sent to the query handler module 432 which parses the query and forwards the parsed query to the data store 434 to retrieve the data (e.g., resultant dataset) matching the user query.

In parallel, the system controller 440 receives result set (block 508) and instructs the privacy risk estimation module 444 to evaluate a privacy risk associated with the result set (block 510). According to example embodiments, the results of the query are not sent directly to the user. Instead, the results of the query are passed to the privacy enhancement module 436 first (more precisely to the system controller 440). The privacy risk estimation module 444 returns a risk value (block 512) to the system controller 440. The system controller 440 communicates the results of the query to the privacy risk estimation module 444, which examines the results of the query and determines the level of privacy risk (e.g., generates the privacy risk value) based on the results of the query and on the criteria defined in the anonymization policy. The anonymization policy may include the metrics used to estimate the risk, the threshold that should be respected in order for the risk to be considered acceptable, and the domain-specific knowledge about what information is to be considered critical. If the criteria are satisfied, the system controller 440 returns the control back to the query handler module 432 and the results of the query are communicated as is to the user interface 416. Otherwise, control is passed to the anonymization module 438.

The system controller 440 instructs the master anonymizer module 448 (block 514) to anonymize the result set. The master anonymizer module 448 is configured to delegate the actual task of treating the input dataset to one of the anonymizer plugging 452-1 to 452-n, each implementing a different privacy enhancement (or data anonymization) algorithm. The master anonymizer module 448 instructs (block 516) the data store 434 to establish a temporary data store. The data store 434 returns (block 518) a handle for the temporary data store. For example, the master anonymizer module 448 creates a temporary storage in the in-memory database. The master anonymizer module 448 passes a reference to this storage to the one or more of the anonymizer plugging 452-1 to 452-n to which the anonymization is delegated.

Using the anonymizer plugging 452-1 to 452-n, the master anonymizer module 448 anonymizes (block 520) the result set. The anonymizer plugging 452-1 to 452-n pass temporary data (block 522 and block 524) to and from the data store 434 using the handle. The anonymizer plugging 452-1 to 452-n returns (block 526) an anonymized result to the master anonymizer module 448. The master anonymizer module 448 forwards (block 528) the anonymized result to the system controller 440. The system controller forwards (block 530) the anonymized result to the query handler module 432.

For example, the anonymization module 438 may be governed by the anonymization policy, which determines the strategy that should be followed to anonymize the result set. The transformation to anonymize the result set is applied on the temporary, high-performance, in-memory storage created by the master anonymization module 438.

The query handler module 432 returns (block 532) a query result (e.g., either the result set or the anonymized result) to the result set explorer module 418. The result explorer module then communicates (block 534) visual information to the privacy meter. For example, when the anonymization module 438 terminates its task (e.g., anonymization is complete), the anonymization module 438 returns control to the system controller 440, and subsequently to the query handler module 432. The query handler module 432 returns the results to the user interface 416.

If the risk associated with the results is above the privacy risk threshold, a message is shown to the user (using the privacy meter 420) indicating that the query could not be satisfied because of the query's privacy risk. If the risk is below the privacy risk threshold, but an anonymization step was performed, the privacy meter may display the risk level, the value of the relevant privacy metric used to compute the risk level, and a link to a further screen that explains what anonymizing manipulation was performed on the dataset. In other words, the user may be informed that the data received as a result of the query is not (exactly) the data requested. For example, the user (using a query) may have requested all engineers in a city (e.g., Boston or Chicago). However, the data returned (e.g., results of the query) may be all engineers in a state (e.g., Massachusetts or Illinois).

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium (e.g., non-transitory storage medium) or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
   receiving a query at an in-memory database;
   generating a resultant dataset based on the query and privacy critical data stored in a data store of the in-memory database, the data store being a random access memory (RAM);
   storing the resultant dataset at the in-memory database;
   determining, by the in-memory database, a privacy risk associated with the resultant dataset, the in-memory database being configured to store the resultant dataset in the RAM and to process operational and transactional data in real-time;
   determining, by the in-memory database, whether the privacy risk is above a threshold value;
   upon determining the privacy risk is above the threshold value,
      anonymizing the resultant dataset based on an anonymization algorithm, the in-memory database being configured to include code configured to:
         identifying at least one column in the resultant dataset to be anonymized based on a combination of data recorded in the at least one column having a combined data attribute causing the privacy risk, and
         cycling through each row in the identified column and anonymize the data recorded in the respective row using the anonymization algorithm;
      returning, by the in-memory database, the anonymized dataset;
      generating a description of the anonymization algorithm used to generate the anonymized dataset and details associated with parameters used in the anonymization algorithm;
      returning, by the in-memory database, the description of the anonymization algorithm and the details associated with parameters used in the algorithm; and
   upon determining the privacy risk is below the threshold value, returning, by the in-memory database, the resultant dataset.

2. The method of claim 1, wherein the privacy risk is based on an anonymity metric.

3. The method of claim 1, wherein the privacy risk is based on a diversity metric.

4. The method of claim 1, wherein the privacy risk is based on a closeness metric.

5. The method of claim 1, wherein the privacy risk is based on at least one of an anonymity metric, a diversity metric, and a closeness metric.

6. The method of claim 1, further comprising:
   storing the resultant dataset includes storing the resultant dataset in the data store, the data store being a first data store;
   storing a copy of the resultant data in a second data store, the second data store being a temporary data store of the in-memory database; and
   anonymizing the copy of the resultant dataset as the anonymized dataset, wherein
      returning the resultant dataset includes returning the stored resultant dataset, and
      returning the anonymized dataset includes returning at least a subset of the anonymized dataset stored in the temporary data store.

7. The method of claim 1, wherein anonymization of the resultant dataset includes obfuscating data in at least one column of the resultant dataset.

8. The method of claim 1, wherein anonymization of the resultant dataset includes selecting an anonymization algorithm based on characteristics of the dataset and an anonymization policy, the anonymization policy including information associated with tables and columns of the database that contain privacy-critical information and privacy metrics.

9. The method of claim 1, wherein anonymization of the resultant dataset includes at least one of removing a column from the resultant dataset, truncating data in at least one column of the resultant dataset, assigning data to a data range in at least one column of the resultant dataset, and randomizing data in at least one column of the resultant dataset.

10. The method of claim 1, further comprising:
    displaying, by a user interface, at least one of a privacy risk of a returned dataset, the returned dataset being one of the resultant dataset and the anonymized dataset, a description of an anonymization algorithm used to generate the anonymized dataset and details associated with parameters used in the algorithm.

11. A system including a non-transitory computer readable medium including code segments that when executed by a processor cause the processor to:
    receive a query at an in-memory database;
    generating a resultant dataset based on the query and privacy critical data stored in a data store of an in-memory database, the data store being a random access memory (RAM);
    storing the resultant dataset at the in-memory database;
    determine, by the in-memory database, a privacy risk associated with the resultant dataset, the in-memory database being configured to store the resultant dataset in the RAM and to process operational and transactional data in real-time;
    determine, by the in-memory database, whether the privacy risk is above a threshold value;
    upon determining the privacy risk is above the threshold value, anonymize the resultant dataset based on an anonymization algorithm, the in-memory database being configured to include code configured to:
identify at least one column in the resultant dataset to be anonymized based on a combination of data recorded in the at least one column having a combined data attribute causing the privacy risk, and
cycle through each row in the identified column and anonymize the data recorded in the respective row using the anonymization algorithm,
return, by the in-memory database, the anonymized dataset;
generate a description of an anonymization algorithm used to generate the anonymized dataset and details associated with parameters used in the anonymization algorithm and
return, by the in-memory database, the description of the anonymization algorithm and the details associated with parameters used in the algorithm; and
upon determining the privacy risk is below the threshold value, return, by the in-memory database, the resultant dataset.

12. The system of claim 11, wherein the privacy risk is based on an anonymity metric.

13. The system of claim 11, wherein the privacy risk is based on a diversity metric.

14. The system of claim 11, wherein the privacy risk is based on a closeness metric.

15. The system of claim 11, wherein the privacy risk is based on at least one of an anonymity metric, a diversity metric, and a closeness metric.

16. The system of claim 11, wherein the code segments, when executed by the processor, further cause the processor to:
store the resultant dataset includes storing the resultant dataset in the data store, the data store being a first data store;
store a copy of the resultant data in a second data store, the second data store being a temporary data store of the in-memory database; and
anonymize the copy of the resultant dataset as the anonymized dataset, wherein
returning the resultant dataset includes returning the stored resultant dataset, and
returning the anonymized dataset includes returning at least a subset of the anonymized dataset stored in the temporary data store.

17. The system of claim 11, wherein anonymization of the resultant dataset includes obfuscating data in at least one column of the resultant dataset.

18. The system of claim 11, wherein anonymization of the resultant dataset includes selecting an anonymization algorithm based on characteristics of the dataset and an anonymization policy, the anonymization policy including information associated with tables and columns of the database that contain privacy-critical information and privacy metrics.

19. The system of claim 11, wherein anonymization of the resultant dataset includes at least one of removing a column from the resultant dataset, truncating data in at least one column of the resultant dataset, assigning data to a data range in at least one column of the resultant dataset, and randomizing data in at least one column of the resultant dataset.

20. The system of claim 11, wherein the code segments, when executed by the processor, further cause the processor to:
display, by a user interface, at least one of a privacy risk of a returned dataset, the returned dataset being one of the resultant dataset and the anonymized dataset, a description of an anonymization algorithm used to generate the anonymized dataset and details associated with parameters used in the algorithm.

* * * * *